April 1, 1958     A. ROESCH ET AL     2,828,938
TURBINE SPINDLE BEARING
Filed May 3, 1955     3 Sheets-Sheet 1
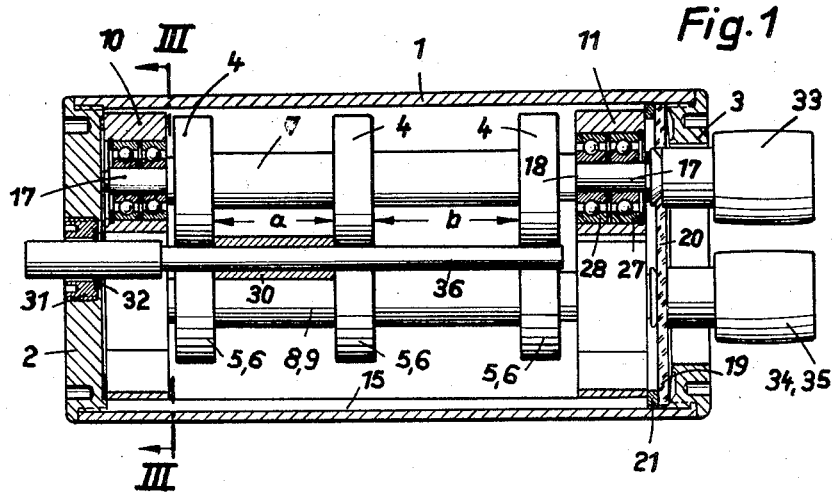
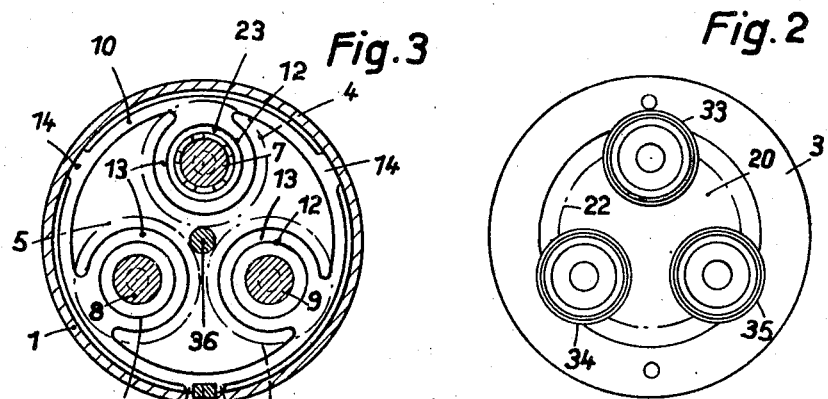
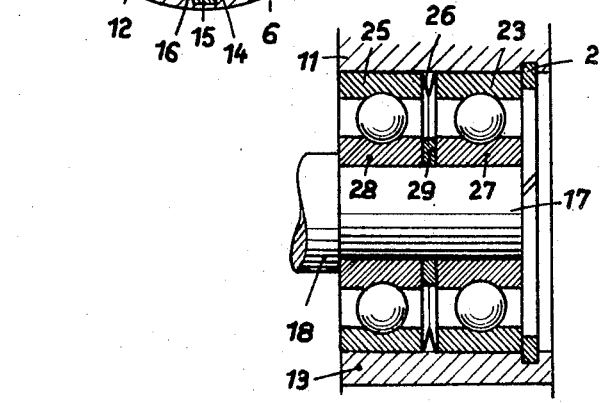
Inventors:
Adolf Roesch,
Hermann Sonnet, and
Ludwig Muth
by: Michael S. Striker agt.

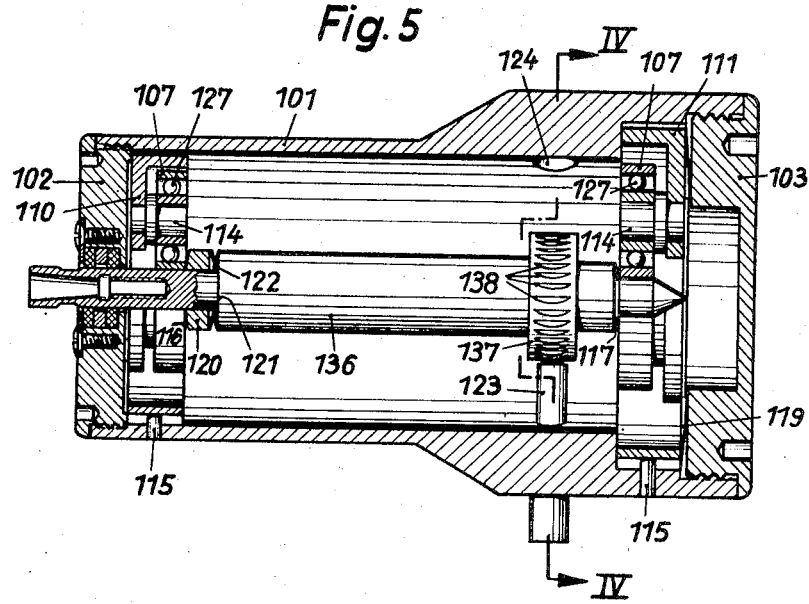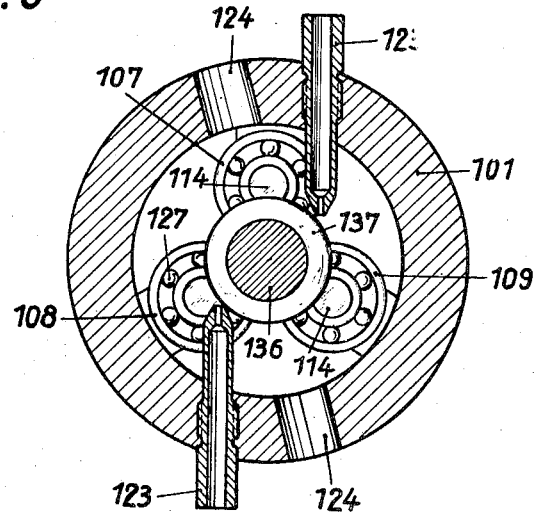

United States Patent Office 2,828,938
Patented Apr. 1, 1958

2,828,938
TURBINE SPINDLE BEARING

Adolf Roesch, Pforzheim, Hermann Sonnet, Eutingen, and Ludwig Muth, Bad Liebenzell, Germany Application May 3, 1955, Serial No. 505,784

Claims priority, application Germany July 30, 1954

10 Claims. (Cl. 253—2)

The present invention relates to bearings for supporting spindles which rotate at a very high speed, such as, for example, grinding spindles, turbine shafts, rotor spindles of an electric motor, and the like.

One of the objects of the present invention is to provide a bearing structure for supporting a rotating spindle entirely without backlash or axial play. Another object of the present invention is to provide a bearing structure for a high speed spindle which is equally adapted to act as a bearing to support the spindle as well as also to support the spindle and drive the same.

A further object of the present invention is to provide a bearing structure for supporting a high-speed spindle by means of at least three rotatable rollers of a diameter considerably exceeding that of the spindle and equidistantly spaced from each other around the spindle so as to support the same on at least three different points.

Another object of the present invention is to provide a mounting for such rollers which assures that they will always be in positive engagement with the spindle under a certain pressure sufficient to transmit the rotary movement of the spindle to the rollers or vice versa.

A further object of the present invention is to provide a bearing of the type as described which is of much simpler construction as well as being far more reliable in its operation than similar bearings previously known.

Another object of the present invention is to provide a mounting which assures a proper engagement of the rollers or bearings with the spindle without resorting to any springs or adjusting devices to urge the rollers in a radial direction toward the spindle axis.

For attaining the above objects the present invention provides a mounting comprising annular mounting elements having at least three ears integral therewith and extending inwardly in a radial direction to support the bearings in which the roller shafts are mounted, and narrow projections extending radially outward from their outer periphery intermediate the adjacent bearing ears for firmly securing these elements within a cylindrical housing so as to be spaced therefrom at all points of their periphery except such projections. The particular configuration of these mounting rings for supporting the rollers provides them with just the proper resiliency to assure that the initial tension under which rollers engage the spindle when installed will be maintained at all times without requiring any separate adjusting means which would complicate the bearing structure, render the same more expensive, and require frequent service which will thus be completely avoided.

In a preferred embodiment of the present invention, all the rollers of one set which are disposed in the same radial position relative to the spindle, are secured on a common shaft which is rotatably mounted at opposite ends in suitable bearings which, in turn, are secured in annular mounting elements as described which are maintained in a fixed spaced relation to each other by suitable shoulders on the roller shafts. The two mounting rings together with the roller shafts are resiliently supported in axial direction by covers closing the ends of the cylindrical housing and these rings are secured in their proper position within the housing and locked against rotation therein by means of a key extending through the housing and engaging in a groove in one of the peripheral projections of the rings. This allows the roller shafts sufficient freedom to expand in axial direction. Such movement should, however, preferably be allowed in only one direction, for which purpose one ring for mounting the rollers abuts tightly against the adjacent cover of the cylindrical housing, while a suitable spring which exerts its force in axial direction is mounted between the other mounting ring and its adjacent housing cover.

These as well as other objects, features, and advantages of the present invention, as well as its method of operation will be best understood from the following detailed description of several specific embodiments thereof when read in connection with the accompanying drawings, wherein Fig. 1 shows a longitudinal section through the housing containing the new bearing designed both to support a tool spindle and to drive the same;

Fig. 2 shows an end view thereof, as seen from the driving side;

Fig. 3 shows a cross section taken along line III—III of Fig. 1;

Fig. 4 shows an enlarged cross section taken in axial direction through one of the bearings supporting a roller shaft;

Fig. 5 shows a longitudinal section through a housing containing a turbine wheel and the bearing structure according to the invention for supporting the shaft of such turbine;

Fig. 6 shows a cross section taken along line VI—VI of Fig. 5;

Fig. 7 shows a longitudinal section through an electric motor with the bearing structure according to the invention for supporting the rotor shaft of such motor; while

Figure 7:
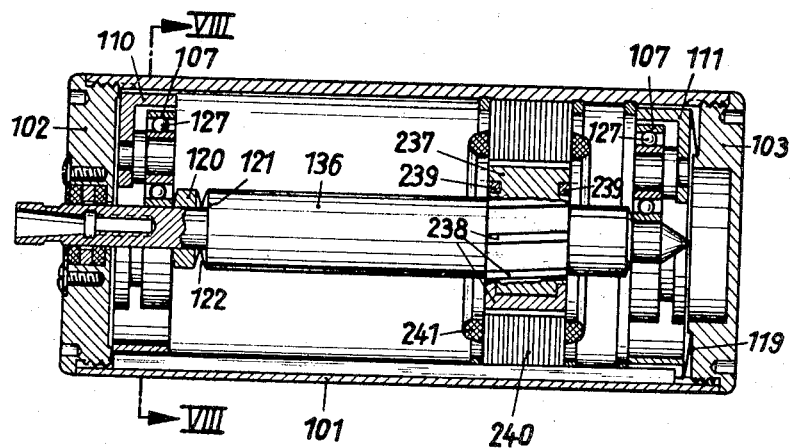

Referring to the drawings, and particularly to Figs. 1 to 4, it will be seen that the new spindle bearing is mounted within a housing 1 which is of cylindrical cross section on its inside and closed at both ends by covers 2 and 3, respectively. For this purpose, covers 2 and 3 are provided with annular threaded flanges which are firmly screwed into the internally threaded open ends of the cylindrical housing 1, as shown particularly in Fig. 1. The spindle 36 to be supported by the new bearing and at the same time to be driven thereby, and which may, for example, be a grinding spindle, is rotatably mounted at three points within the housing 1 preferably between three sets of rollers 4, 5, and 6, respectively, which are made of a diameter considerably larger than the diameter of the spindle. The corresponding rollers of all three sets are rigidly secured on shafts 7, 8, and 9, respectively, and are preferably integral therewith. Shafts 7, 8, and 9 are each rotatably supported at their opposite ends in suitable antifriction bearings 37 which will be later described in detail and which are fitted into bores 12 of two similar annular mounting elements 10 and 11. These mounting elements 10 and 11 consist of relatively thin rings made of steel of high resilient qualities.

Projecting radially inward from three points on the inner periphery of these rings 10 and 11 and equidistantly spaced from each other and integral with the rings 10 and 11 respectively are three ears 13 with the bores 12 therein for supporting the antifriction bearings 37. For securing the rings 10 and 11 in the housing 1, they are provided at their outer periphery and intermediate adjacent ears 13 with three small projections 14 extending radially outward and having an outer diameter substantially equal to the inner diameter of the housing 1. These projections 14 transmit the bearing stresses to the housing 1 and also locate the rings 10 and 11 in their proper central position within the housing 1 so that their outer periphery will be spaced a small distance from the inner wall of the housing 1. Being made of spring steel, the intermediate portions of the rings 10 and 11 disposed between the supporting projections 14 are permitted a certain resiliency in a radial direction whereby the rollers 4, 5, and 6 when being assembled may exert a certain initial pressure upon the spindle 36 which is just sufficient to produce the traction necessary to transmit the rotary movement of the spindle to the rollers without however, exerting any binding action or undue friction upon the spindle 36. The inherent resiliency of the rings 10 and 11 assures that such small initial pressure of the rollers upon the spindle 36 will, when once adjusted, be maintained at all times.

For properly locating the rings 10 and 11 within the housing 1 so that the corresponding bores 12 of both rings in which the antifriction bearings 37 are mounted will be exactly coaxial with each other, and for preventing the rings 10 and 11 from turning within the housing 1, a key 15 may be fitted into a groove in the inner wall of the housing 1 which preferably extends longitudinally from one end thereof to the other, and engages in a corresponding groove 16 in one of the projections 14 of the rings 10 and 11, as illustrated particularly in Fig. 3.

The two rings 10 and 11 are maintained in their proper spaced relation to each other by annular shoulders 18 on the shafts 7, 8, and 9 formed by making the trunnions 17 thereof of smaller diameter. Toward the outside, rings 10 and 11 together with the shafts 7, 8, and 9 are secured in their proper axial position within the housing 1 by the two threaded covers 2 and 3. For obtaining the proper resiliency of the shafts 7 to 9 in their axial direction and preventing them from scoring or binding on the shoulders 18, a suitable spring is preferably interposed between these elements. If, as shown in Fig. 1, the spindle 36 emerges from the housing 1 through the left cover 2 to carry a suitable tool on its free end, the ring 10 then preferably abuts directly upon the inner surface of the cover 2, while the spring is provided between the other ring 11 and the cover 3. Thus, the bearing shafts 7, 8, and 9 together with their rollers 4, 5, and 6 abut solidly against the left side of the housing 1 but are allowed a certain resiliency toward the right.

Such axial resiliency is obtained in the embodiment of the invention as shown in Fig. 1 by a plate spring 19 which is inserted between the annular bearing cover 3 and a disk 20 of a diameter corresponding to the inner diameter of housing 1. For transmitting the axial forces to the plate spring 19, a ring 21 similar to a piston ring is slideably fitted against the inner wall of the housing 1 between the disk 20 and the ring 11. The disk 20 preferably consists of a transparent material such as Plexiglas so as to permit inspection of the interior of the housing 1 and the bearings therein. It may also serve as an oil gauge, in which event it may be provided with an oil level mark in the form of a circular line 22 coaxial with the housing 1. Obviously, the bearing cover 3 may also be designed to take the place of the disk 20 by being made of transparent material and provided with an oil level mark.

The antifriction bearings 37 provided in the embodiment of the invention shown in Figs. 1 to 4 for supporting the roller shafts 7, 8, and 9 each consist of two ball bearings 38 and 39. The outer race 23 of the bearings 38 facing the housing cover 2 or 3, respectively, abuts against a suitable shoulder inwardly projecting from the wall of the bore 12 in the ears 13 of the rings 10 and 11. In this particular embodiment of the invention, as may best be seen in Fig. 4, such shoulder is formed of a spring ring 24 fitted into an annular groove in the wall of the bore 12, which has the advantage that the bores 12 may be drilled and finished accurately without difficulty. The outer race 25 of the other ball bearing 39 is resiliently supported in axial direction relative to the outer race 23 of the first ball bearing 38 by intermediate plate springs 26, while the inner races 27 and 28 of the two bearings 38 and 39 on each end of the shafts 7 to 9 are separated by an intermediate ring 29. Thus, the bearings 39 facing inwardly and abutting against the shoulders 18 on the shafts 7 to 9 may yield slightly in axial direction so as to compensate for any small variations in measurement which might be incurred in the production of the bearings.

Spindle 36 is secured in axial position within the housing 1 as well as relative to the rollers 4, 5, and 6 by means of a bushing 30 secured thereto between two adjacent sets of rollers. For mounting a suitable tool on the spindle 36, the housing cover 2 has screwed centrally therein a bushing 31 with a gasket 32, preferably of a spongy synthetic material such as a polyamide, the outer end of the spindle 36 extending through such gasket 32 and bushing 31. Gasket 32 is provided to seal the bushing 31 to prevent the lubricating oil within the housing from seeping therefrom.

For driving the spindle 36, the ends of the shafts 7, 8, and 9 facing in the opposite direction of the end of the spindle 36 on which the tool is to be mounted are extended through the cover 3 and have mounted thereon drive pulleys 33, 34, and 35, respectively, which may be surrounded and driven by a single belt. The rotation of the shafts 7, 8, and 9 is then transmitted through the rollers 4, 5, and 6 to the spindle 36, the proper traction between the rollers and the spindle being maintained at all times by the mounting rings 10.

By inspection of Fig. 1 it will be seen that the distances between the individual sets of rollers differ from each other, and that the distance $a$ between the rollers facing the tool side of the spindle 36 is made smaller than the distance $b$ facing the drive pulleys 33 to 35. This is done to prevent the formation of internodes and dangerous transverse vibrations in the spindle. The ratio of the diameters of the rollers and the spindle is preferably made in uneven numbers so that the same points on the periphery of the rollers will not periodically meet the same points on the periphery of the spindle. This expedient will prevent uneven wear of the rollers and the spindle.

The two modifications of the present invention shown in Figs. 5 to 8 illustrate bearing structures in which the spindle is driven directly so that the rollers are only required to act as bearing elements therefor.

In the embodiment of the invention as shown in Figs. 5 and 6, the spindle 136 carries a turbine wheel 137 which is driven by compressed air within a housing 101, and is rotatably mounted between two sets of bearing rollers 107, 108, and 109. The rings 110 and 111 on which the bearings 107 to 109 are mounted, are substantially the same as those described with reference to Fig. 1, and are inserted from opposite sides into the housing 101 and locked against rotation by pins 115 engaging in a groove 115' extending parallel to the axis of the bearings. The rollers 107 to 109 on each side of the housing 101 are rotatably mounted on trunnions 114 which are secured in the rings 110 and 111, forming the outer races of ball bearings 127. Rings 110 and 111 are maintained in their proper axial position relative to each other by shoulders 116 and 117, respectively, on the spindle 136 abutting upon the inner side faces of the rollers 107 to 109. These shoulders 116 and 117, are preferably rounded off, as can be plainly seen in Fig. 5, so as to reduce their point of engagement with the rollers 107 to 109 to a minimum. Similarly as shown in Fig. 1, a plate spring 119 is interposed between the ring 111 and the adjacent cover 103, and forces all the bearing elements including the spindle 136 toward the left so that the other ring 110 will abut against the housing cover 102. To allow for a slight expansion of the shaft 136 in axial direction between the two sets of rollers 107 to 109, the left shoulder 116 is preferably formed not on the spindle 136 itself but on a separate ring 120 which is slideable on the spindle 136, and one or a pair of plate springs 122 is interposed between the other side of the ring 120 and an adjacent shoulder 121 on the spindle 136.

The peripheral surface of the turbine wheel 137 on the spindle 136 is provided with toothlike notches 138 of curved shape to form buckets. For conducting the compressed air against the buckets 138 so as to rotate the turbine wheel 137 and drive the spindle 136, at least two nozzle tubes 123 are passed through suitable bores in the wall of the housing 101 and are tightly screwed therein, extending substantially tangentially to the periphery of the turbine wheel 137 so that the compressed air issuing from their nozzles will strike the buckets 138 at the proper angle and thereafter escape through vents 124 and housing 101. Obviously, the construction of the turbine may be easily modified to permit it to be driven by any other pressure medium than compressed air.

Figure 8:
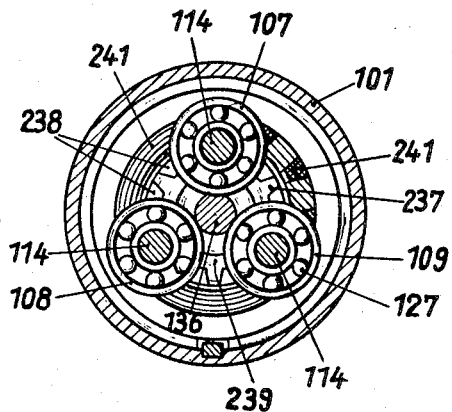
Fig. 8 shows a cross section along line VIII—VIII of Fig. 7.

The embodiment of the invention shown in Figs. 7 and 8 differs from that shown in Figs. 5 and 6 insofar as instead of carrying a turbine wheel, the spindle 136 carries a rotor 237 which is adapted to rotate within an electromagnetic field, thus constituting an electric motor. Since the bearing structure for supporting the spindle is substantially the same in both embodiments, the same reference numerals as used in Figs. 5 and 6 are applied to similar parts in Figs. 7 and 8. Rotor 237 is provided with grooves 238 which are slightly inclined to the rotor axis and communicate with annular grooves 239 formed in both side faces of the rotor. Both grooves 238 and 239 are filled with copper, the rotor 237 thus forming a short-circuited or squirrel cage rotor which is rotatable within an electromagnetic field provided by the stator 240 surrounding the same.

The stator 240 is formed in the usual manner of laminated dynamo iron provided with grooves for carrying the field windings 241, and this stator is solidly mounted within the housing 101 and surrounds the rotor 237 with a small intermediate air gap.

Although not particularly shown in Figs. 7 and 8, suitable apertures may be provided in the wall of the housing 101 to pass the leads therethrough for supplying current to the field windings 241.

Although our invention has been illustrated and described with reference to high speed grinding spindles, turbines, and electric motors, we desire to have it understood that it is in no way limited to the details of such embodiments or to the specific examples described, but is capable of numerous modifications within the scope of the appended claims.

Having thus fully disclosed our invention, what we claim as new is:

1. In an arrangement of the character described, in combination, a housing, a spindle within said housing, a plurality of bearings equidistantly distributed about said spindle, said bearings having an outer diameter substantially greater than that of said spindle, the outer peripheral surface of each of said bearings being in engagement with said spindle, at least two rings within said housing, one of said rings located near each end of said housing, each of said rings having a plurality of ears integral therewith and extending radially inward therefrom, said bearings mounted on said ears so as to permit said outer peripheral surface of said bearings to rotate relative to said ears, and a plurality of members intermediate the inner wall of said housing and the outer peripheral surface of said rings for securing said rings in a corresponding position to said inner wall and in a spaced relation thereto, each of said members being located radially intermediate adjacent ears, said rings urging said bearings under a certain resilient pressure into engagement with said spindle.

2. In an arrangement of the character described, in combination, a housing having two ends, a spindle located at least partly within said housing, at least three rollers within said housing and equidistantly distributed about said spindle and in engagement therewith, said rollers having a diameter substantially greater than that of said spindle, at least two rings within said housing, one of said rings located near each end of said housing, each of said rings having three ears integral therewith and extending radially inward therefrom and equidistantly spaced from each other, means for rotatably mounting said rollers on said ears, respectively, and at least three members intermediate the inner wall of said housing and the outer periphery of said rings for securing said rings in a corresponding position to said inner wall and in a spaced relation thereto, each of said members being located radially intermediate adjacent ears, said rings urging said rollers under a certain resilient pressure into engagement with said spindle.

3. In an arrangement of the character described, in combination, a housing, a spindle within said housing, a plurality of bearings equidistantly distributed about said spindle, said bearings having an outer diameter substantially greater than that of said spindle, the outer peripheral surface of each of said bearings being in engagement with said spindle, at least two relatively thin rings of spring steel within said housing, one of said rings having a plurality of ears integral therewith and extending radially inward therefrom, said bearings mounted on said ears so as to permit said outer peripheral surface of said bearings to rotate relative to said ears, and a plurality of members intermediate the inner wall of said housing and the outer peripheral surface of said rings and being integral with said peripheral surface for securing said rings in a corresponding position to said inner wall and in a spaced relation thereto, each of said members being located radially substantially in the middle between adjacent ears, the resiliency of said rings urging said rollers under a certain pressure uniformly into engagement with said spindle.

4. In an arrangement of the character described, in combination, a housing having two ends, a spindle located at least partly within said housing, at least three rollers within said housing and equidistantly distributed about said spindle and in engagement therewith, said rollers being located within substantially the same vertical plane relative to said spindle and having a diameter substantially greater than that of said spindle, at least two rings within said housing and coaxially with said spindle, one of said rings located near each end of said housing, each of said rings having three ears integral therewith and extending radially inward therefrom and equidistantly spaced from each other, means for rotatably mounting said rollers on said ears, respectively, each of said rings having at least three projections extending radially outward from its outer periphery, each of said projections located radially intermediate adjacent ears, said projections abutting against the inner surface of said housing, and means for securing both of said rings in a corresponding position within said housing, said rings urging said rollers under a certain resilient pressure into engagement with said spindle.

5. In an arrangement of the character described, in combination, a housing having a substantially cylindrical inner wall and two ends, covers closing said ends, at least one of said covers having a central opening, a spindle centrally mounted within said housing and extending through said opening toward the outside, at least three rollers within said housing and equidistantly distributed about said spindle and in engagement therewith, said rollers being located within substantially the same vertical plane relative to said spindle and having a diameter substantially greater than that of said spindle, a plurality of relatively thin rings within said housing and coaxially with said housing and spindle, and having an outer diameter slightly smaller than the inner diameter of said housing, one of said rings located near each end of said housing adjacent said covers, each of said rings having at least three ears integral therewith and extending radially inward therefrom and equidistantly spaced from each other, bearing means mounted on each of said ears for rotatably supporting said rollers on said ears, respectively, each of said rings having at least three projections extending radially outward from its outer periphery, each of said projections located radially substantially in the middle between adjacent ears, said projections abutting against the inner surface of said housing, and means for securing both of said rings in a corresponding position within said housing, said rings urging said rollers under a certain resilient pressure into engagement with said spindle.

6. In an arrangement of the character described, in combination, a housing having a cover at each end, a spindle within said housing and extending through at least one of said covers to the outside, a plurality of bearings equidistantly distributed about said spindle, said bearings having an outer diameter substantially greater than that of said spindle, the outer peripheral surface of each of said bearings being in engagement with said spindle, at least two rings within said housing adjacent said covers, each of said rings having three ears integral therewith and extending radially inward therefrom, said bearings mounted on said ears so as to permit said outer peripheral surface of said bearings to rotate relative to said ears, each of said rings having three projections extending radially outward from its outer periphery and abutting against the inner wall of said housing so as to space said rings therefrom, each of said projections located radially substantially in the middle between adjacent ears, said rings urging said bearings under a certain resilient pressure into constant engagement with said spindle, means intermediate said rings for maintaining the same in a fixed spaced relation to each other, one of said rings abutting directly upon one of said covers, and an annular plate spring intermediate the other cover and the other ring for compensating any axial play of the various elements within said housing.

7. In an arrangement of the character described, in combination, a housing having a cover at each end, a spindle within said housing and extending through at least one of said covers to the outside, a plurality of bearings equidistantly distributed about said spindle, said bearings having an outer diameter substantially greater than that of said spindle, the outer peripheral surface of each of said bearings being in engagement with said spindle, at least two rings within said housing adjacent said covers, each of said rings having three ears integral therewith and extending radially inward therefrom, said bearings mounted on said ears so as to permit said outer peripheral surface of said bearings to rotate relative to said ears, each of said rings having three projections extending radially outward from its outer periphery and abutting against the inner wall of said housing so as to space said rings therefrom, each of said projections located radially substantially in the middle between adjacent ears, said rings urging said bearings under a certain resilient pressure into constant engagement with said spindle, means intermediate said rings for maintaining the same in a fixed spaced relation to each other, one of said rings abutting directly upon one of said covers, an annular member slideably mounted within said housing and abutting upon the other ring, and an annular plate spring intermediate the other cover and said annular member for compensating any axial play of the various elements within said housing, said other cover consisting of transparent material having a circular mark thereon concentrical with said spindle for indicating the oil level within said housing.

8. In an arrangement of the character described, in combination, a housing having a cover at each end, a spindle within said housing and extending through at least one of said covers to the outside, a plurality of bearings equidistantly distributed about said spindle, said bearings having an outer diameter substantially greater than that of said spindle, the outer peripheral surface of each of said bearings being in engagement with said spindle, at least two rings within said housing adjacent said covers, each of said rings having three ears integral therewith and extending radially inward therefrom, said bearings mounted on said ears so as to permit said outer peripheral surface of said bearings to rotate relative to said ears, each of said rings having three projections extending radially outward from its outer periphery and abutting against the inner wall of said housing so as to space said rings therefrom, each of said projections located radially substantially in the middle between adjacent ears, said rings urging said bearings under a certain resilient pressure into constant engagement with said spindle, means intermediate said rings for maintaining the same in a fixed spaced relation to each other, one of said rings abutting directly upon one of said covers, an annular member slideably mounted within said housing and abutting upon the other ring, a transparent disk slideably mounted within said housing adjacent said annular member and having a circular mark thereon concentrical with said spindle for indicating the oil level within said housing, said other cover being of annular shape, and an annular plate spring intermediate said other cover, and said disk for compensating any axial play of the various elements within said housing.

9. In an arrangement of the character described, in combination, a housing, a spindle within said housing, a plurality of bearings equidistantly distributed about said spindle, said bearings having an outer diameter substantially greater than that of said spindle, the ratio of said two diameters being uneven, the outer peripheral surface of each of said bearings being in engagement with said spindle, at least two relatively thin rings of spring steel within said housing, one of said rings having a plurality of ears integral therewith and extending radially inward therefrom, said bearings mounted on said ears so as to permit said outer peripheral surface of said bearings to rotate relative to said ears, and a plurality of members intermediate the inner wall of said housing and the outer peripheral surface of said rings and being integral with said peripheral surface for securing said rings in a corresponding position to said inner wall and in a spaced relation thereto, each of said members being located radially substantially in the middle between adjacent ears, the resiliency of said rings urging said rollers under a certain pressure uniformly into engagement with said spindle.

10. In an arrangement of the character described, in combination, a housing having a cover on each end, a spindle within said housing, and extending with one end through one of said covers to the outside for mounting a tool thereon, a turbine wheel mounted on said spindle wtihin said housing, means extending into said housing for conducting a pressure medium upon said turbine wheel so as to rotate the same, two sets of three bearings at opposite sides of said turbine wheel and adjacent said covers, respectively, and equidistantly distributed about said spindle, said bearings each comprising an inner race and a rotatable outer race, the peripheral surface of said outer race being in engagement with said spindle and having a diameter substantially greater than the portions of said spindle intermediate the three bearings of each set, a relatively thin ring with said housing near each end thereof, each of said rings having three ears integral therewith and extending radially inward therefrom and equidistantly spaced from each other, each of said ears having an aperture, the corresponding apertures of both rings being coaxial, a trunnion secured within each of said apertures, the inner race of each of said ball bearings being mounted on said trunnions, respectively, said spindle having a flange intermediate said turbine wheel and said bearings on each side of said turbine wheel, said flanges abutting upon said bearings, respectively, for maintaining said rings in a fixed spaced relation to each other, and a plurality of members intermediate the inner wall of said housing and the outer peripheral surface of said rings for securing said rings in a corresponding position to said inner wall and in a spaced relation thereto, each of said members being located radially intermediate adjacent ears, said rings urging said outer races under a certain resilient pressure into engagement with said spindle, and a plate spring intermediate the cover remote from the tool end of said spindle and the adjacent ring for compensating for any expansion of said spindle.

References Cited in the file of this patent
UNITED STATES PATENTS

| | | |
|---|---|---|
| 1,660,489 | Hirvonen | Feb. 28, 1928 |
| 1,827,968 | Bryant | Oct. 20, 1931 |
| 2,053,425 | Else | Sept. 8, 1936 |
| 2,067,155 | Levy et al. | Jan. 5, 1937 |
| 2,189,615 | Rampacher | Feb. 6, 1940 |
| 2,382,526 | White | Aug. 14, 1945 |
| 2,577,180 | Buchi | Dec. 4, 1951 |
| 2,638,310 | Merriman | May 12, 1953 |
| 2,676,276 | Parker | Apr. 20, 1954 |

FOREIGN PATENTS

| | | |
|---|---|---|
| 964,750 | France | Feb. 1, 1950 |